(12) United States Patent
DeYoreo et al.

(10) Patent No.: US 7,293,388 B2
(45) Date of Patent: *Nov. 13, 2007

(54) ADAPTIVE CONTROL SYSTEM

(75) Inventors: Salvatore DeYoreo, Andover, MA (US); Karl Winkler, Bedford, MA (US); David Stevens, Billerica, MA (US)

(73) Assignee: Armatron International, Inc., Malden, MA (US)

( * ) Notice: Subject to any disclaimer, the term of this patent is extended or adjusted under 35 U.S.C. 154(b) by 150 days.

This patent is subject to a terminal disclaimer.

(21) Appl. No.: 11/129,519

(22) Filed: May 13, 2005

(65) Prior Publication Data

US 2006/0254124 A1   Nov. 16, 2006

(51) Int. Cl.
*A01M 1/06* (2006.01)
*A01M 1/02* (2006.01)
*A01M 1/10* (2006.01)

(52) U.S. Cl. .......................... 43/139; 43/107
(58) Field of Classification Search .................. 43/107, 43/112, 113, 139
See application file for complete search history.

(56) References Cited

U.S. PATENT DOCUMENTS

| | | | | |
|---|---|---|---|---|
| 4,519,776 A * | 5/1985 | DeYoreo et al. | ............... | 43/107 |
| 4,788,789 A * | 12/1988 | Boobar et al. | ................. | 43/113 |
| 4,834,644 A * | 5/1989 | Snow | ........................... | 431/18 |
| 4,913,128 A * | 4/1990 | Adachi | ........................ | 431/12 |
| 4,992,039 A * | 2/1991 | Lockwood, Jr. | ............. | 431/75 |
| 4,995,376 A * | 2/1991 | Hanson | ........................ | 431/12 |
| 5,118,281 A * | 6/1992 | Bramlette et al. | ............ | 431/75 |
| 5,122,053 A * | 6/1992 | Basten | ........................ | 431/12 |
| 5,203,687 A * | 4/1993 | Oguchi | ........................ | 431/18 |
| 5,302,111 A * | 4/1994 | Jouvaud et al. | ............... | 431/12 |
| 5,657,576 A * | 8/1997 | Nicosia | ........................ | 43/107 |
| 5,669,176 A * | 9/1997 | Miller | ........................ | 43/139 |
| 5,799,436 A * | 9/1998 | Nolen et al. | .................. | 43/112 |
| 5,813,166 A * | 9/1998 | Wigton et al. | ................ | 43/139 |
| 5,865,611 A * | 2/1999 | Maiello | ........................ | 431/12 |
| 6,035,810 A * | 3/2000 | Movassaghi | ................. | 431/12 |
| 6,145,243 A * | 11/2000 | Wigton et al. | ................ | 43/139 |
| 6,402,505 B1 * | 6/2002 | Okada et al. | ................. | 431/18 |
| 6,468,069 B2 * | 10/2002 | Lemelson et al. | ............ | 431/12 |
| 6,594,944 B2 * | 7/2003 | Chura | ........................ | 43/112 |
| 6,594,946 B2 * | 7/2003 | Nolen et al. | .................. | 43/107 |
| 6,600,960 B1 * | 7/2003 | Keegan | ........................ | 700/21 |
| 6,647,302 B2 * | 11/2003 | Pouchak | ...................... | 700/83 |

(Continued)

FOREIGN PATENT DOCUMENTS

WO    WO-2004/082376 A1 *   9/2004

(Continued)

*Primary Examiner*—Darren W. Ark
(74) *Attorney, Agent, or Firm*—Gauthier & Connors LLP

(57) ABSTRACT

In an insect lure and trap, a system for generating a carbon dioxide attractant has a combustion chamber in which carbon dioxide is generated by means of an exothermic reaction from a gaseous fuel rich in carbon. A container contains a pressurized supply of said fuel and a supply line connects said container to said combustion chamber. A normally closed valve is included in said supply line. The system includes means for sensing the temperature in said combustion chamber and for generating a control signal representative of said temperature. A controller responsive to said control signal compares said temperature to a reference temperature and opens said valve during selected segments of successive equal time intervals.

20 Claims, 7 Drawing Sheets

U.S. PATENT DOCUMENTS

| | | | |
|---|---|---|---|
| 6,655,078 B2 * | 12/2003 | Winner et al. | 43/107 |
| 6,655,080 B2 * | 12/2003 | Spiro et al. | 43/139 |
| 6,662,489 B2 * | 12/2003 | Spiro et al. | 43/107 |
| 6,708,443 B2 * | 3/2004 | Hall | 43/107 |
| 6,764,298 B2 * | 7/2004 | Kim et al. | 431/12 |
| 6,802,706 B2 * | 10/2004 | Collesan | 431/18 |
| 6,817,139 B1 * | 11/2004 | Powell et al. | 43/139 |
| 6,817,140 B1 * | 11/2004 | Durand et al. | 43/139 |
| 6,840,005 B2 * | 1/2005 | Durand et al. | 43/139 |
| 6,925,752 B1 * | 8/2005 | Cherry et al. | 43/139 |
| 7,035,717 B2 * | 4/2006 | Wintrich et al. | 700/274 |
| 2003/0084604 A1 * | 5/2003 | Durand et al. | 43/139 |
| 2004/0063054 A1 * | 4/2004 | Cain | 431/12 |
| 2004/0170937 A1 * | 9/2004 | Asano et al. | 431/18 |
| 2004/0197239 A1 * | 10/2004 | Mirkovic et al. | 431/75 |
| 2005/0066570 A1 * | 3/2005 | Mosher et al. | 43/139 |
| 2005/0214703 A1 * | 9/2005 | Andreasen | 431/18 |
| 2006/0105279 A1 * | 5/2006 | Munsterhuis et al. | 431/18 |
| 2006/0172238 A1 * | 8/2006 | Cook | 431/75 |
| 2006/0177785 A1 * | 8/2006 | Varagani et al. | 431/12 |
| 2006/0204911 A1 * | 9/2006 | Teng | 431/76 |
| 2007/0039568 A1 * | 2/2007 | Hall et al. | 431/18 |

FOREIGN PATENT DOCUMENTS

WO    WO-2006/108244 A1 * 10/2006

* cited by examiner

ADAPTIVE CONTROL SYSTEM

BACKGROUND

1. Field of the Invention

The present invention relates to the field of devices for trapping insects, and in particular to an insect lure and trap system that uses a carbon dioxide ($CO_2$) attractant.

2. Description of the Prior Art

Generating carbon dioxide to attract mosquitos and other blood seeking insects by combusting a hydrocarbon fuel is well known. For example, U.S. Pat. No. 6,145,243 entitled "Method and Device Producing $CO_2$ Gas for Trapping Insects" discloses a device for attracting and trapping bothersome flying insects.

A problem with this system is that it requires a fixed orifice in the fuel line to control the volume of gas needed to maintain a desired exothermic reaction. Propane and other petroleum fuels, as commercially available, generally are contaminated with foreign particles and also with oil, some of which is applied during the manufacture of the tank to prevent rust on the tank's internal surfaces. The oil and foreign particles pass along with the gas through the system's valve and into the fixed orifice where they result in clogging or serve to alter the size of the orifice. This causes the exothermic reaction to lose efficiency or cease to operate entirely causing system failure. Filters placed in the gas line ahead of the valve and orifice likewise clog or become contaminated with oil and restrict the flow of gas or block it entirely. Frequent cleaning or replacement of the filter is a necessity. Purging the gas flow system, including the valve and restrictive orifice, requires an external source of gas, such as a $CO_2$ cartridge, and is costly, only marginally successful, and requires frequent application.

SUMMARY OF THE INVENTION

An objective of the present invention is to incorporate an adaptive control system to an insect lure and trap system that does not rely on a fixed orifice to meter the volume of gas needed to maintain an exothermic reaction. The use of an adaptive control system prevents losses in efficiency and possible total failure of the $CO_2$ generating system due to contaminates in the fuel supply.

Accordingly, in one aspect of the present invention, in an insect lure and trap, a system for generating a carbon dioxide attractant has a reactor in which carbon dioxide is generated by means of an exothermic reaction from a gaseous hydrocarbon fuel. A container contains a pressurized supply of said fuel. A supply line connects the container to said reactor. The system includes a normally closed valve in said supply line. The system further includes means for sensing the temperature in said reactor and for generating a control signal representative of said temperature. A controller responds to said control signal for comparing said temperature to a reference temperature and opens said valve during selected segments of successive equal time intervals.

In another aspect of the present invention, a method of luring and trapping insects includes generating carbon dioxide by combusting a gaseous fuel provided by a normally closed valve that is open during selected segments of successive equal time intervals. A temperature of the generator is sensed and compared to a reference value. Selected segments during which the valve is open is increased if the temperature is below the reference value. Selected segments during which the valve is open is decreased if the temperature is above the reference value.

Some advantages of the system according with the present invention are that the system continuously adjusts the volume of gas delivered to the reactor, allowing for maximum efficiency during startup when the gas/air mixture needs to be richer than at operating temperatures. The valve of the system is continuously pulsed, preventing particulates from building up on the valve surfaces, which avoids poor seating of the valve. The system of the present invention readily adapts to variations in materials used to produce the exothermic reaction. For example, variations in the thickness or quality of the catalyst plating are offset by the system adjusting the volume of gas flowing to the catalyst to maintain the optimum catalyst temperature for maximum $CO_2$ conversion. The system according to the present invention is not dependent upon a restrictive orifice to meter the gas and so is not subject to malfunctions due to particulates and petroleum residues in the gas. Consequently, the system does not require purging or other cleaning actions.

These and other features and objectives of the present invention will now be described in greater detail with reference to the accompanying drawings.

DETAILED DESCRIPTION

Figure 1:
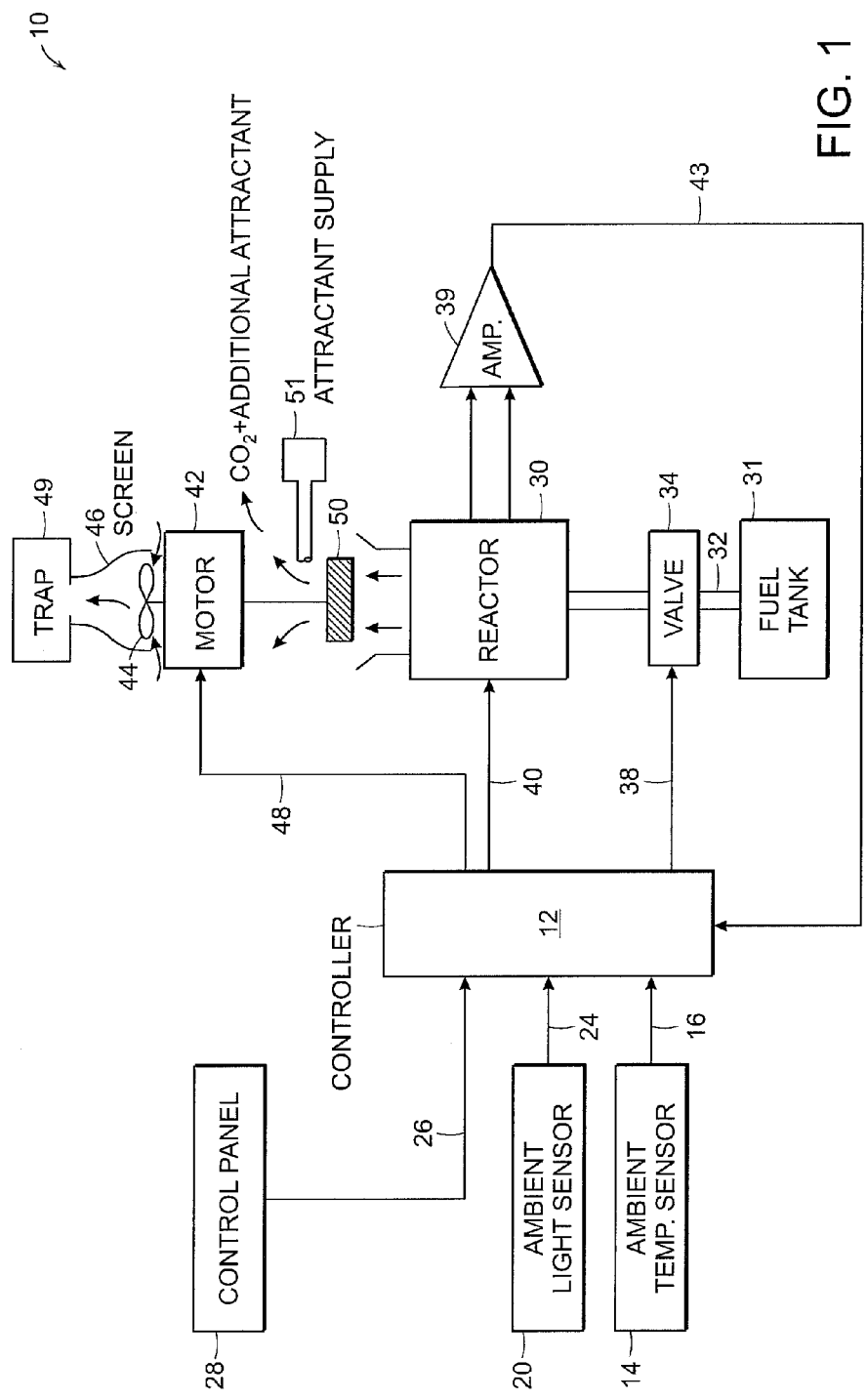
FIG. 1 shows a functional block diagram of an insect lure and trap system.

Referring to FIG. 1, insect lure and trap system 10 includes a controller 12 that receives a plurality of input signals and controls a plurality of output devices to control the operation of the system. The controller 12 comprises a controller/microprocessor (not shown) that executes program instructions to read the various input signals and control the output devices.

The system includes an ambient temperature sensor 14 that provides a signal on a line 16 to the controller 12, and an ambient light sensor 20 (e.g., a photocell) that provides a signal on a line 24 indicative of the amount of ambient light. A mode select signal on a line 26 is received from a mode select panel 28 that allows a user to select the operating mode of the system. Details of the various modes are discussed below.

The system 10 also includes an exothermic reactor 30 that generates carbon dioxide ($CO_2$) gas that is used as an attractant. A tank 31 provides a gas fuel via a flow line 32 to a normally closed valve 34, which receives a valve command signal to open on a line 38 from the controller. When the valve 34 is open, fuel is released to the exothermic reactor 30. In some examples, tank 31 is removable and/or disposable and the fuel is propane, butane, methanol, or any low molecular weight paraffin gas.

Figure 2:
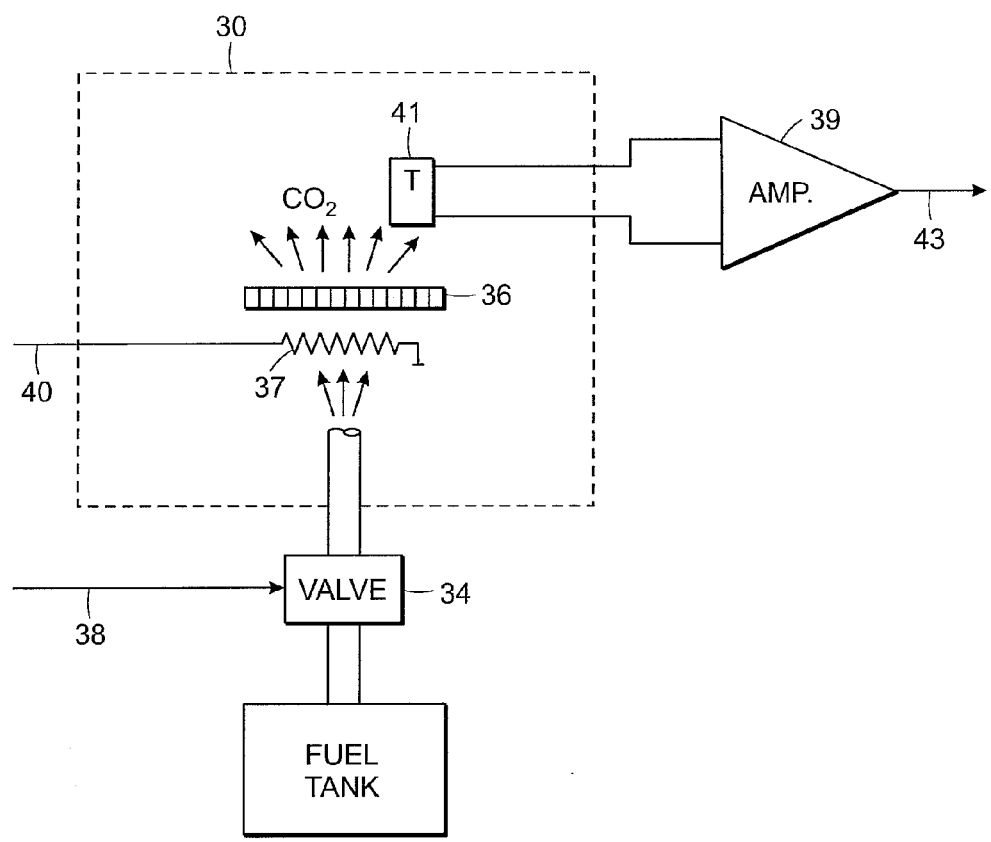
FIG. 2 is a simplified illustration of an arrangement of an exothermic fuel reactor, the fuel tank and valve.

Referring to FIG. 2, the fuel flows from the valve 34 through a catalyst 36, which could include a ceramic honeycomb material that is coated with an element such as platinum or palladium. The heater 37 is mounted preferably directly below the catalyst 36. In one embodiment the heater 37 may be a resistive heating element that receives a pre-heater control signal on a line 40. The heater 37 heats the catalyst 36 to a point the catalyst can begin the self-sustaining exothermic reaction that generates the $CO_2$ as the fuel passes through the catalyst. The control signal on the line 40 commands the heater on and off. A temperature sensor 41 (e.g., a thermocouple) is preferably located above the catalyst 36 to sense the temperature of the $CO_2$ gas passing through the catalyst, and the temperature sensor 41 provides a temperature signal indicative thereof to an amplifier 39 and then out through line 43.

Referring to FIG. 1, the trap system 10 also includes a motor 42 that drives a fan 44, which provides air flow through a screen 46 causing insects to be trapped on an interior side of the screen 46. The controller 12 provides a motor command signal on a line 48 to the motor 42. This command signal commands the motor on and off. The motor also drives an impeller 50 located in a flow path of the $CO_2$ gas, to facilitate exhausting the $CO_2$. In one example, the system 10 may also include an attractant supply 51, such as a removable and replaceable time release cartridge containing Octenol, which releases attractant to create a $CO_2$ and attractant mix.

The operation of the catalyst 36 and specifically the generation of the $CO_2$ is substantially the same as disclosed in U.S. Pat. No. 4,519,776 entitled "Apparatus for Attracting Insects", assigned to Armatron International, Incorporated, the assignee of the present invention, and incorporated herein by reference. However, unlike the device disclosed in U.S. Pat. No. 4,519,776, the insect lure and trap system of the present invention includes an adaptive control system that monitors the temperature of reactor 30 and automatically controls the flow of fuel to ensure the system operates efficiently.

Figure 3:
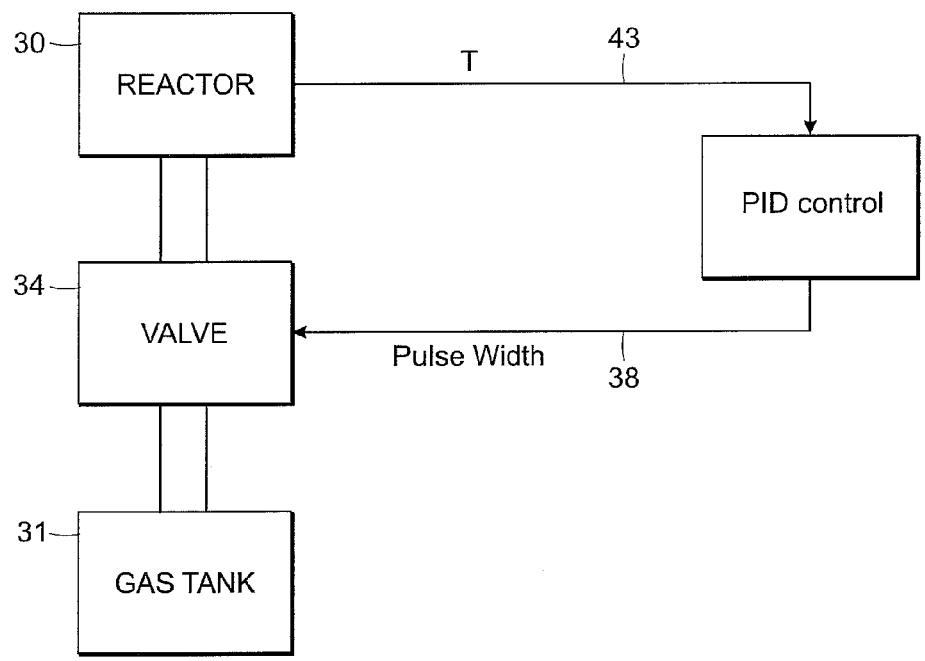
FIG. 3 is a functional block diagram of a method for controlling a valve.
Figure 4:
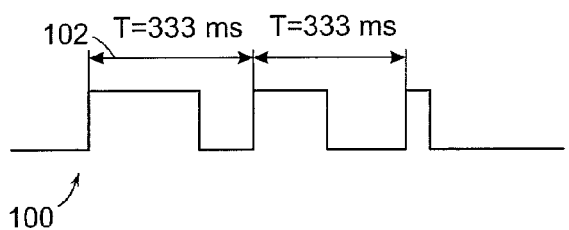
FIG. 4 is an illustration of a valve control signal.

Referring to FIGS. 3 and 4, system 10 produces the maximum amount of carbon dioxide when the temperature in reactor 30 is closest to a temperature set point, such as 1000° F., for example. To automatically adjust the temperature, system 10 uses a so-called "proportional-integral-derivative" (hereinafter "PID") feedback control loop. The input of the PID is the temperature of reactor 30. The output is the width of pulse 100 which is returned to valve 34 over line 38 to control the time during which valve 34 is open. By controlling the width of pulse 100, the volume of fuel flowing to reactor 30 and therefore the temperature of reactor 30 are controlled. The pulse period 102 is constant and, in one example, is about 333 milliseconds.

The pulse width (PW) is calculated according to the following formula:

$$PW = K*e(t) + \frac{\Delta}{T_i}\int_0^t e(t)dt + Td\frac{de(t)}{dt} \qquad (1)$$

where e is the control error determined by the difference between the temperature set point for maximum $CO_2$ output ($T_{setpoint}$) and the temperature of the reactor ($T_{reactor}$). The pulse width is the sum of three terms. The proportional term ("P" term) is proportional to the control error. The integral term ("I" term) provides a control action that is proportional to the time integral of the control error and ensures that the steady state error becomes zero. The derivative term ("D" term) is proportional to the time derivative of the control error and improves closed loop stability.

Figure 5:
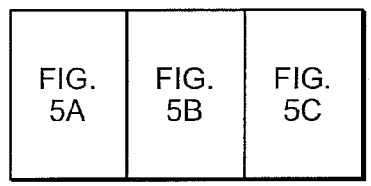
FIG. 5 is a schematic illustration of the controller.
Figure 5A:
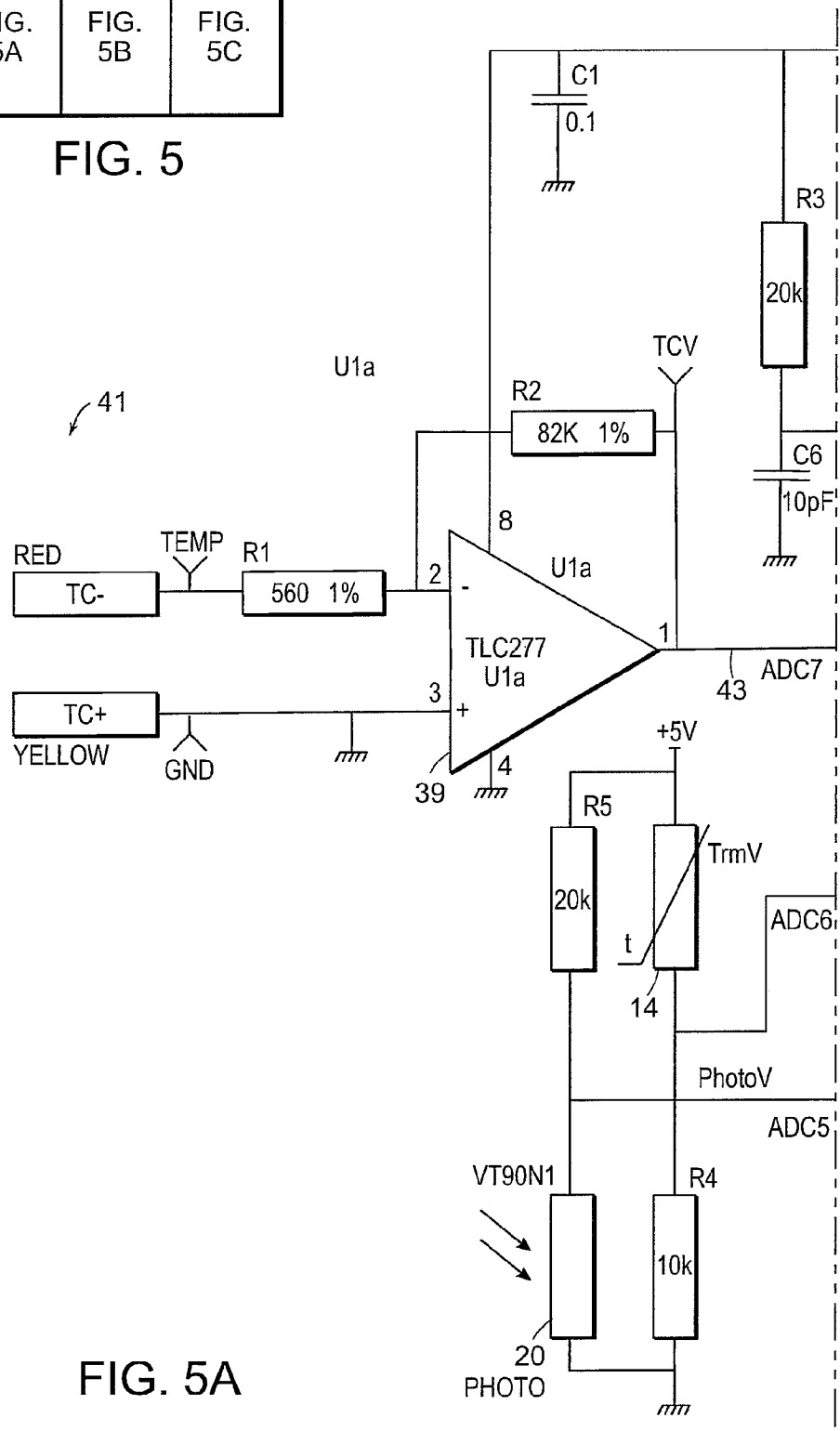
Figure 5B:
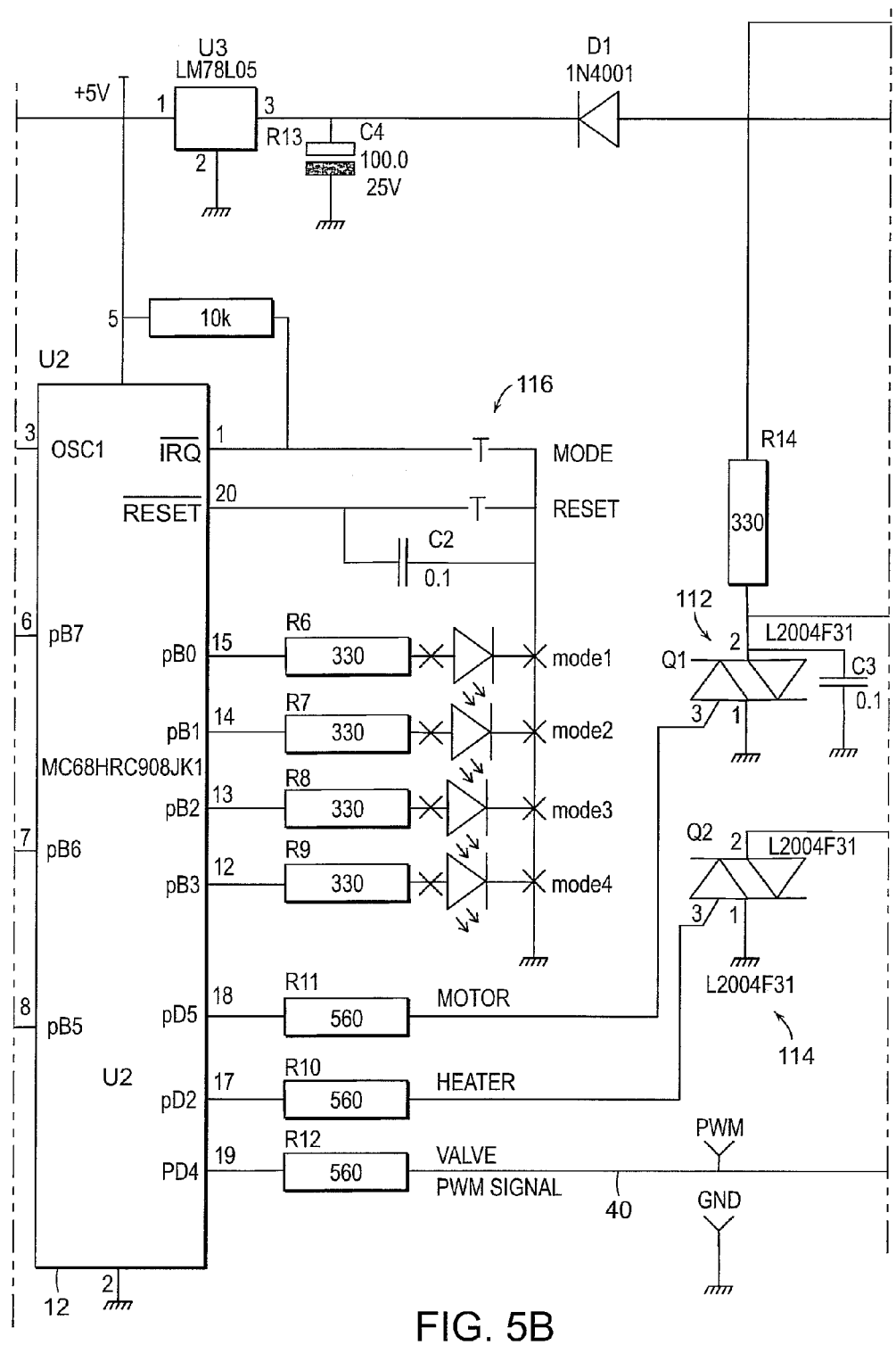
Figure 5C:
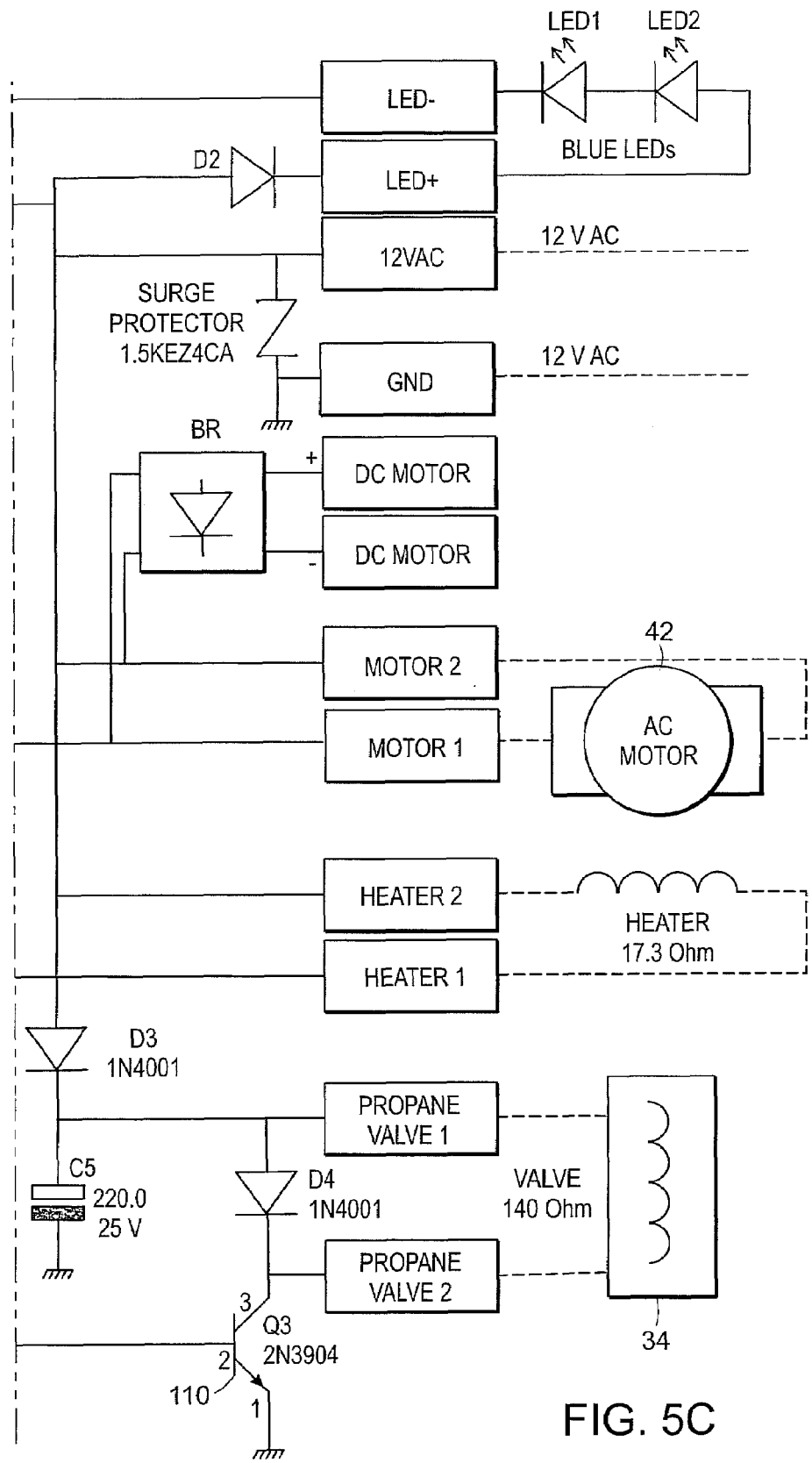

Referring to FIG. 5, temperature in the reactor 30 is measured by thermocouple 41, which produces a voltage that is amplified by operational amplifier 39 and enters microcontroller 12 on line 43. Microcontroller 12 generates a pulse width signal according to the PID equation and outputs the pulse width signal on line 40. The pulse width signal opens or closes transistor 110 whereby the collector current thereof opens or closes valve 34 accordingly.

At the same time, the microcontroller controls the motor 42 which drives fan 44 used to draw insects into trap 49 and also drives impeller 50 to propel $CO_2$ out of the trap. Microcontroller 12 also controls heater 37 to preheat the catalyst to facilitate combustion of the fuel. Motor 42 and heater 37 are controlled in response to information received from ambient light sensor 20 and ambient temperature sensor 14, as well as signals from the mode selector switch located on control panel 28. Motor control and heater control are performed through triac 112 and triac 114 respectively.

Figure 6:
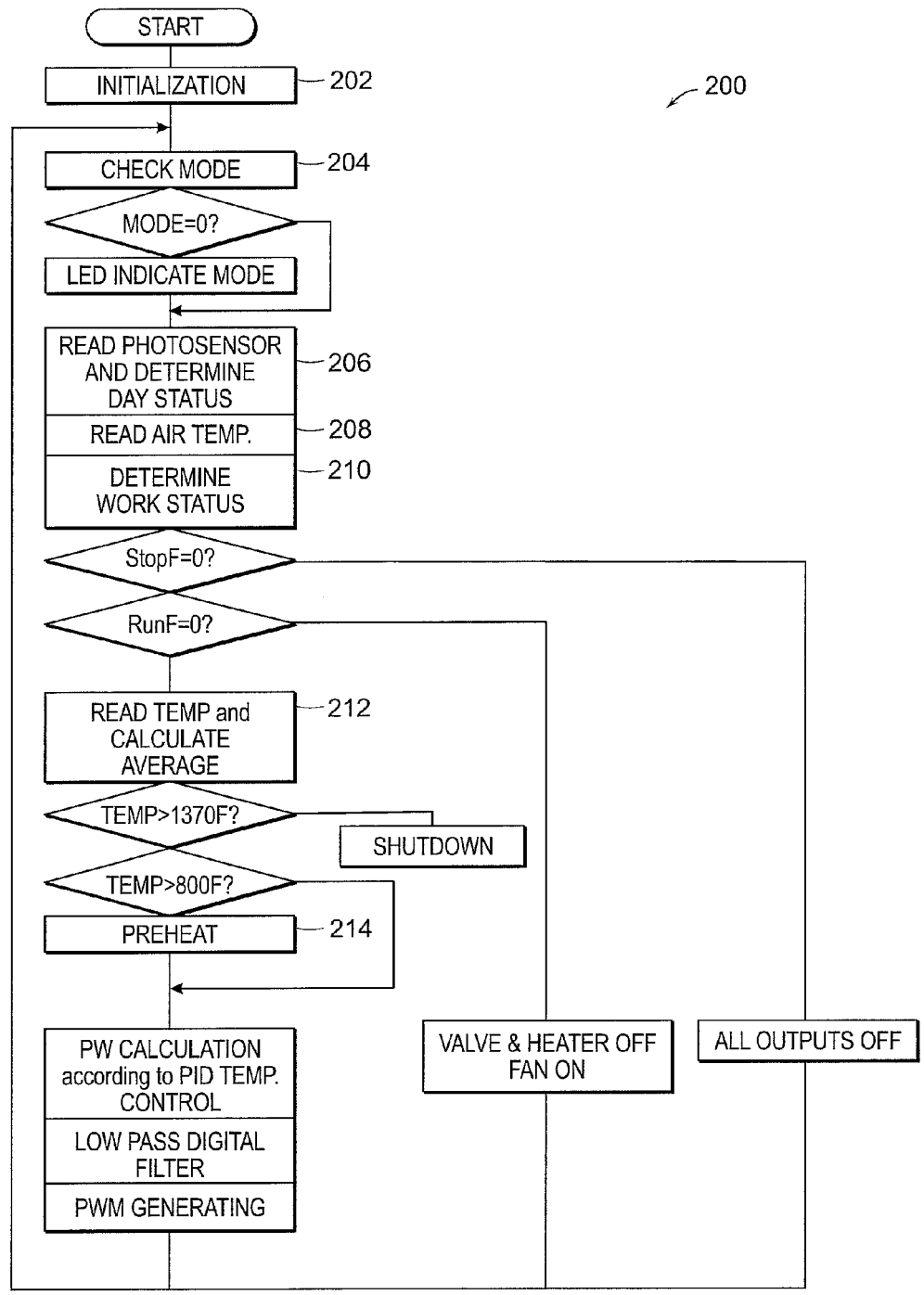
FIG. 6 is a flow chart illustration of the system operation.

FIG. 6 is a flow chart illustration 200 of the system operation. Following a system reset/power-up, initialization 202 is performed to clear all outputs and set the stand-by mode 0. Test 204 is performed to determine if any mode has been set by an operator. If a mode has been set, the mode is memorized and indicated on the device panel 28.

Mode 0 is a stand-by mode. Mode 1 is a manual mode. Mode 2 is an automatic mode in which the system comes on at dusk and operates (i.e., dispenses attractant) for three hours. Mode 3 is an automatic mode in which the system comes on at dusk and operates for three hours and comes on again at dawn for two hours. Mode 4 is also an automatic mode in which the system operates starting at dusk for a period of four hours, and again starting at dawn for a period of three hours.

Test 206 determines the day status which could be Dawn, Daytime, Dusk, or Night according to the photo sensor 20 reading and predetermined time duration of each state.

Test 208 checks the ambient temperature and if the temperature is below a threshold value (e.g., 55° F.), the system is commanded not to run in the automatic mode.

Step 210 analyses information from steps 204, 206, and 208 to determine the system work status: either stop all operations; stop valve 34 and heater 37 but leave motor 42 running; or run all output devices. Step 212 checks the reactor 30 temperature and if the temperature is above the pre-determined upper threshold level of normal reactor 30 operation (e.g., 1370° F.), the system shuts down and can be activated only by the operator. If the temperature is below the pre-determined lower threshold level of normal reactor 30 operation (e.g., 800° F.), step 214 initiates the preheat function. If the temperature is within the range of normal reactor 30 operation, the pulse width applied to valve 34, which regulates the amount of gas supplied to reactor 30, will be controlled in accordance with the standard PIED algorithm to keep the reactor 30 temperature at the level of normal reactor 30 operation.

One of ordinary skill in the art will recognize that the present invention is of course not limited to the specific valve timing and threshold values discussed herein as way example. For example, the specific valve timing and threshold values will be a function of the overall system design. In addition, although the embodiments illustrated herein employ a normally OFF valve, the system may be modified to use a modulating valve that receives a command signal to control the flow of gas from the tank, rather than opening and closing the valve. It is further contemplated that various types of sensors may be employed. For example, it is contemplated that sensors other than thermocouples, thermistors and photocells may be used to sense the associated parameters. Also, the present invention is not limited to placing the temperature sensor that senses the exhaust gas temperature in close proximity to the catalyst. Other locations in the CO$_2$ flow path may provide sensing locations that allow fuel flow to be controlled as a function of temperature, while maintaining the exothermic reaction. Furthermore, although the control technique of the present invention has been discussed in the context of incorporating a PID feedback loop on temperature, it is contemplated that the loop may be controlled by sensing other parameter(s) indicative of the exothermic reaction (e.g., the amount of CO$_2$ gas).

It should be further understood that although the system employs a controller that receives the sensed analog signal values, digitizes the values and processes the resultant digitized values to perform the control functions of the present invention, a less complex controller may be used that, for example, receives Boolean inputs. It suffices, that a number of different embodiments can be provided to enjoy the benefits of controlling the flow of fuel as a function of the exhaust gas/catalyst temperature.

Although the present invention has been shown and described with respect to several preferred embodiments thereof, various changes, omissions and additions to the form and detail thereof, may be made therein, without departing from the spirit and scope of the invention.

What is claimed is:

1. A system for generating a carbon dioxide attractant, said system comprising:
   a combustion chamber in which carbon dioxide is generated by means of an exothermic reaction from a gaseous fuel rich in carbon, said carbon dioxide being provided to an output flow area;
   a supply line providing a supply of said fuel to said combustion chamber;
   a valve disposed in said supply line;
   means for sensing a reactor temperature in said combustion chamber and for generating a control signal representative of said reactor temperature; and
   a controller for adjusting selected segments of successive equal time intervals during which said valve is open responsive to:
      a proportional term that is proportional to a difference between a reference temperature and the reactor temperature;
      an integral term that is proportional to a time integral of the difference between the reference temperature and the reactor temperature; and
      a derivative term that is proportional to a time derivative of the difference between the reference temperature and the reactor temperature.

2. The system of claim 1, further comprising means for generating airflow that forces insects within a predetermined region into a container.

3. The system of claim 1, further comprising an ambient light sensor that is coupled to the controller.

4. The system of claim 1, further comprising an ambient temperature sensor that is coupled to the controller.

5. The system of claim 1, wherein said equal time intervals are each about 333 milliseconds.

6. The system of claim 1, wherein said reference signal is temperature is about 1000° F.

7. In an insect lure and trap, a system for generating a carbon dioxide attractant, comprising:
   a combustion chamber in which carbon dioxide is generated by means of an exothermic reaction from a gaseous fuel rich in carbon;
   a container containing a pressurized supply of said fuel;
   a supply line connecting said container to said combustion chamber;
   a normally closed valve in said supply line;
   means for sensing a reactor temperature in said combustion chamber and for generating a control signal representative of said temperature; and
   a controller responsive to said control signal for comparing said reactor temperature to a reference temperature and providing a valve control signal responsive to:
      a proportional term that is proportional to a difference between the reference temperature and the reactor temperature;
      an integral term that is proportional to a time integral of the difference between the reference temperature and the reactor temperature; and
      a derivative term that is proportional to a time derivative of the difference between the reference temperature and the reactor temperature;
   wherein said controller further provides that said valve is opened by the valve control signal responsive to each of the proportional term, the integral term and the derivative term.

8. The system of claim 7, wherein said reference temperature is a temperature set point for a desired CO$_2$ output.

9. The system of claim 7, further comprising means for generating airflow that forces insects within a predetermined region into another container.

10. The system of claim 7, further comprising an ambient light sensor coupled to a microprocessor.

11. The system of claim 7, further comprising an ambient temperature sensor coupled to a microprocessor.

12. The system of claim 7, wherein said valve control signal is a pulse width modulated signal.

13. The system of claim 7, wherein said reference temperature is about 1000° F.

14. A method of generating a carbon dioxide attractant, said method comprising the steps of:
   providing a combustion chamber in which carbon dioxide is generated by means of an exothermic reaction from a gaseous fuel rich in carbon;
   supplying said fuel from a container containing a pressurized supply of said fuel via a supply line to said combustion chamber;
   sensing a reactor temperature in said combustion chamber and generating a control signal representative of said reactor temperature;
   comparing said reactor temperature to a temperature set point for a desired CO$_2$ output and providing a control error signal that is determined by the difference between the temperature set point for the desired CO$_2$ output and the reactor temperature;
   determining a proportional term that is proportional to the control error signal;
   determining an a integral term that is proportional to time integral of the control error signal;
   determining a derivative term that is proportional to a time derivative of the control error signal;
   providing a pulse width modulated control signal to a normally closed valve in the supply line that is the sum of the proportional term, the integral term and the derivative term to selectively permit the gaseous fuel to flow to the combustion chamber; and
   providing carbon dioxide from the combustion chamber to an output flow area.

15. The method of claim 14, wherein said method further includes the step of generating air flow in the output flow area.

16. The method of claim 15, wherein said step of generating air flow in the output flow area involves operating a fan.

17. The method of claim 14, wherein said method further includes the step of detecting an amount of ambient light and providing a signal that is representative of the amount of ambient light.

18. The method of claim 14, wherein said method further includes the step of detecting an ambient temperature and providing a signal that is representative of the ambient temperature.

19. The method of claim 14, wherein the pulse width modulated signal has a period of about 333 milliseconds.

20. The method of claim 14, wherein the temperature set point for the desired $CO_2$ output is about 1000° F.

* * * * *

UNITED STATES PATENT AND TRADEMARK OFFICE
CERTIFICATE OF CORRECTION

PATENT NO. : 7,293,388 B2
APPLICATION NO. : 11/129519
DATED : November 13, 2007
INVENTOR(S) : DeYoreo et al.

Page 1 of 1

It is certified that error appears in the above-identified patent and that said Letters Patent is hereby corrected as shown below:

In Col. 4, line 50, please delete "PIED" and replace with --PID--.

In Col. 5, line 60, claim 6, please delete "signal is".

In Col. 6, line 57, claim 14, please insert --a-- before "time".

Signed and Sealed this

Eleventh Day of March, 2008

JON W. DUDAS
*Director of the United States Patent and Trademark Office*